United States Patent
Zhou et al.

(10) Patent No.: US 9,001,765 B2
(45) Date of Patent: Apr. 7, 2015

(54) METHOD, BASE STATION AND USER EQUIPMENT FOR TRANSMITTING PHYSICAL RESOURCE BLOCKS AND ESTIMATING CHANNELS

(71) Applicant: Huawei Technologies Co., Ltd., Shenzhen, Guangdong (CN)

(72) Inventors: Yongxing Zhou, Shenzhen (CN); Weijun Sun, Shenzhen (CN); Kunpeng Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 190 days.

(21) Appl. No.: 13/742,899

(22) Filed: Jan. 16, 2013

(65) Prior Publication Data

US 2013/0142150 A1    Jun. 6, 2013

Related U.S. Application Data

(63) Continuation of application No. PCT/CN2011/075217, filed on Jun. 2, 2011.

(30) Foreign Application Priority Data

Jul. 16, 2010   (CN) .......................... 2010 1 0231709

(51) Int. Cl.
*H04W 4/00* (2009.01)
*H04B 7/216* (2006.01)
(Continued)

(52) U.S. Cl.
CPC .............. *H04W 72/04* (2013.01); *H04L 5/0048* (2013.01); *H04L 25/0202* (2013.01); *H04L 25/0204* (2013.01); *H04L 5/0051* (2013.01); *H04L 25/0206* (2013.01); *H04L 25/0226* (2013.01)

(58) Field of Classification Search
USPC .................................. 370/329–338
See application file for complete search history.

(56) References Cited

U.S. PATENT DOCUMENTS

2006/0072604 A1   4/2006   Sutivong et al.
2007/0040703 A1   2/2007   Akkarakaran et al.
(Continued)

FOREIGN PATENT DOCUMENTS

CN   101132381 A   2/2008
CN   101146317 A   3/2008
(Continued)

OTHER PUBLICATIONS

Search Report in corresponding Chinese Patent Application No. 201010231709.4 (Mar. 4, 2013).
(Continued)

*Primary Examiner* — Brandon Renner
(74) *Attorney, Agent, or Firm* — Leydig, Voit & Mayer, Ltd.

(57) ABSTRACT

A method, a base station and a user equipment for transmitting physical resource blocks and estimating channels are provided. The method includes: scheduling, by a base station, M PRBs for the user equipment, and configuring reference signal patterns for the M PRBs as following: allocating (X−1)M+1 demodulation reference signal subcarriers for M PRBs in a frequency domain, configuring only one demodulation reference signal subcarrier within a range of (−N, N] subcarriers in a border of every two PRBs, where locations of the rest (X−2)M+2 demodulation reference signal subcarriers keep consistent with locations of demodulation reference signal subcarriers in M contiguous first demodulation reference signal patterns in a frequency domain; and transmitting the configured M PRBs to the user equipment, so that the user equipment performs joint channel estimation according to the configured M PRBs. This saves reference signal overheads and optimizes data transmission rate.

12 Claims, 5 Drawing Sheets

(51) Int. Cl.
*H04W 72/04* (2009.01)
*H04L 5/00* (2006.01)
*H04L 25/02* (2006.01)

(56) References Cited

U.S. PATENT DOCUMENTS

| | | | |
|---|---|---|---|
| 2008/0192847 A1 | 8/2008 | Classon et al. | |
| 2011/0085519 A1* | 4/2011 | Koivisto et al. | 370/335 |
| 2011/0176532 A1* | 7/2011 | Franceschini et al. | 370/342 |
| 2012/0033630 A1* | 2/2012 | Chung et al. | 370/329 |
| 2012/0115520 A1* | 5/2012 | Rossel et al. | 455/501 |

FOREIGN PATENT DOCUMENTS

| | | |
|---|---|---|
| CN | 101155194 A | 4/2008 |
| CN | 101292487 A | 10/2008 |
| CN | 101425989 A | 5/2009 |
| CN | 101662434 A | 3/2010 |
| WO | WO 2005/122447 A1 | 12/2005 |

OTHER PUBLICATIONS

Extended European Search Report in corresponding European Patent Application No. 11786109.6 (Aug. 14, 2013).

Ozdemir et al., "Channel Estimation for Wireless OFDM Systems," *IEEE Communications Surveys & Tutorials*, $2^{nd}$ quarter 2007, vol. 9, No. 2, New York, New York.

"3GPP TSG RAN WG1 #58bis; Discussion on DM-RS for LTE-Advanced," Oct. 2009, R1-094088, Valbonne, France.

"3GPP TSG RAN WG1 Meeting #58b; Downlink DM-RS Design Considerations for LTE-A," Oct. 2009, R1-094106, Valbonne, France.

"3GPP TSG RAN WG1 Meeting #59bis; DMRS discussion for rank 5-8," Jan. 2010, R1-100246, Valbonne, France.

"3GPP TSG RAN WG1 Meeting #60bis; DMRS PRB bundling discussion," Apr. 2010, R1-101952, Valbonne, France.

Written Opinion of the International Searching Authority in corresponding PCT Patent Application No. PCT/CN2011/075217 (Sep. 8, 2011).

International Search Report in corresponding PCT Patent Application No. PCT/CN2011/075217 (Sep. 8, 2011).

* cited by examiner

METHOD, BASE STATION AND USER EQUIPMENT FOR TRANSMITTING PHYSICAL RESOURCE BLOCKS AND ESTIMATING CHANNELS

CROSS-REFERENCE TO RELATED APPLICATIONS

This application is a continuation of International Patent Application No. PCT/CN2011/075217, filed on Jun. 2, 2011, which claims priority to Chinese Patent Application No. 201010231709.4, filed on Jul. 16, 2010, both of which are incorporated herein by reference in their entirety.

FIELD OF THE INVENTION

Embodiments of the present invention relate to the field of communication technologies and, in particular, to a method, a base station and a user equipment for transmitting physical resource blocks and estimating channels

BACKGROUND OF THE INVENTION

The multi-antenna technology can fully utilize space resources of signals to meet the requirement for a higher peak rate without increasing the bandwidth. The main process may be described as follows: A serial data stream at the transmitter undergoes necessary space-time processing to form multiple information sub-streams, and the information sub-streams are transmitted by multiple antennas, and recovered to the data stream at the receiver by using the detection technology. An important prerequisite for a multi-antenna system to obtain a high data transmission rate is that CSI (channel state information, channel state information) is known. In practice, however, the CSI is usually unknown. Therefore, accurate channel estimation is a key technology for ensuring transmission quality in a multi-antenna system.

At present, channel estimation is classified into blind estimation and training-sequence-based estimation. In training-sequence-based channel estimation, the transmitter inserts a certain number of reference signals into data packets, and the receiver estimates channel coefficients for the position of the known reference signals, obtains channel coefficients for the position of the data by using the channel estimation algorithm and performs data balancing and decoding. The number, position, and adopted sequence of the reference signals all affect channel estimation performance.

When the channel frequency selectivity is low and the channel is relatively flat, multiple PRBs (Physical Resource Block, physical resource block) are bundled, that is, PRB bundling (physical resource block bundling channel estimation) is used to improve the channel estimation precision.

In the prior art, when multiple PRBs are bundled for channel estimation, the position and number of reference signals remain the same as when a single PRB is used for channel estimation, causing redundancy and uneven density of the reference signals and affecting the data transmission rate.

SUMMARY OF THE INVENTION

Embodiments of the present invention provide a method, a base station and a user equipment for transmitting physical resource blocks and estimating channels, which implement adaptive adjustment of a reference signal structure based on the number of bundled PRBs and improve the system performance.

An embodiment of the present invention provides a method for transmitting physical resource blocks, including:

scheduling, by a base station, M physical resource blocks (PRBs) for a user equipment, and configuring reference signal patterns for the M PRBs, where a method for configuring the reference signal patterns includes:

allocating $(X-1)M+1$ demodulation reference signal subcarriers for M PRBs in a frequency domain, and based on a boundary of every two PRBs, configuring only one demodulation reference signal subcarrier within a range of $(-N, N]$ subcarriers in the border of every two PRBs, where the locations of rest $(X-2)M+2$ demodulation reference signal subcarriers keep consistent with the locations of demodulation reference signal subcarriers in M contiguous (PRB) first demodulation reference signal patterns in a frequency domain;

where X indicates number of demodulation reference signal subcarriers included in the reference signal pattern of a single PRB when the base station allocates the single PRB to the user equipment for channel estimation; M is a positive integer greater than 1; N is a positive integer greater than 1 and smaller than or equal to $12/(X+1)$; the demodulation reference signal subcarrier refers to a subcarrier carrying demodulation reference signals; the first demodulation reference signal pattern refers to a demodulation reference signal pattern used when the base station allocates the single PRB to the user equipment for channel estimation; and transmitting the configured M PRBs to the user equipment, so that the user equipment performs joint channel estimation according to the configured M PRBs.

An embodiment of the present invention provides another method for transmitting PRBs, including:

scheduling, by a base station, two physical resource blocks (PRBs) for a user equipment, and configuring reference signal patterns for the two PRBs, where a method for configuring the reference signal patterns includes:

allocating five demodulation reference signal subcarriers for the two PRBs in a frequency domain, and based on a boundary of the two PRBs, configuring only one demodulation reference signal subcarrier within a range of $(-2, 2]$ subcarriers in the border of the two PRBs, where locations of the rest four demodulation reference signal subcarriers keep consistent with locations of demodulation reference signal subcarriers in two contiguous first demodulation reference signal patterns in a frequency domain;

where the demodulation reference signal subcarrier refers to a subcarrier carrying demodulation reference signals; the first demodulation reference signal pattern refers to a demodulation reference signal pattern used when the base station allocates a single PRB to the user equipment for channel estimation; and transmitting the two configured PRBs to the user equipment, so that the user equipment performs joint channel estimation according to the two configured PRBs.

An embodiment of the present invention provides another method for transmitting PRBs, including:

scheduling, by a base station, three physical resource blocks (PRBs) for a user equipment, and configuring reference signal patterns for the three PRBs, where a method for configuring the reference signal patterns includes:

allocating seven demodulation reference signal subcarriers for the three PRBs in a frequency domain, and based on a boundary of every two PRBs out of the three PRBs, configuring only one demodulation reference signal subcarrier within a range of $(-2, 2]$ subcarriers in the border of every two PRBs, where locations of the rest five demodulation reference signal subcarriers keep consistent with locations of demodulation reference signal subcarriers in three contiguous first demodulation reference signal patterns in a frequency domain;

where the demodulation reference signal subcarrier refers to a subcarrier carrying demodulation reference signals; the first demodulation reference signal pattern refers to a demodulation reference signal pattern used when the base station allocates a single PRB to the user equipment for channel estimation; and transmitting the three configured PRBs to the user equipment, so that the user equipment performs joint channel estimation according to the three configured PRBs.

An embodiment of the invention provides a method for estimating channels, including:

receiving, by a user equipment, the M physical resource blocks (PRBs) sent by a base station for joint channel estimation, where the M PRBs include (X−1)M+1 demodulation reference signal subcarriers, and based on a boundary of every two PRBs, only one demodulation reference signal subcarrier is within a range of (−N, N] subcarriers in the border of every two PRBs, and locations of the rest (X−2)M+2 demodulation reference signal subcarriers keep consistent with locations of demodulation reference signal subcarriers in M contiguous first demodulation reference signal patterns in a frequency domain;

where X indicates number of demodulation reference signal subcarriers included in the reference signal pattern of a single PRB when the base station allocates the single PRB to the user equipment for channel estimation; M is a positive integer greater than 1; N is a positive integer greater than 1 and smaller than or equal to 12/(X+1); the demodulation reference signal subcarrier refers to a subcarrier carrying demodulation reference signals; the first demodulation reference signal pattern refers to a demodulation reference signal pattern used when the base station allocates the single PRB to the user equipment for channel estimation;

obtaining, by the user equipment, received signal values of the demodulation reference signal from the demodulation reference signal subcarrier for the M PRBs, and based on the received signal values, estimating channel coefficients for the position of the demodulation reference signal; and obtaining channel coefficients for the position of data in the M PRBs according to the channel coefficients for the position of the demodulation reference signal and a relative position relationship between the demodulation reference signal and the data.

An embodiment of the present invention provides a base station, including:

a configuring unit, configured to schedule M physical resource blocks (PRBs) for a user equipment and configure reference signal patterns for the M PRBs according to a first manner, where the first manner includes:

allocating (X−1)M+1 demodulation reference signal subcarriers for the M PRBs in a frequency domain, and based on a boundary of every two PRBs, configuring only one demodulation reference signal subcarrier within a range of (−N, N] subcarriers in the border of every two PRBs, where locations of the rest (X−2)M+2 demodulation reference signal subcarriers keep consistent with locations of demodulation reference signal subcarriers in M contiguous first demodulation reference signal patterns in a frequency domain;

where X indicates number of demodulation reference signal subcarriers included in the reference signal pattern of a single PRB when the base station allocates the single PRB to the user equipment for channel estimation; M is a positive integer greater than 1; N is a positive integer greater than 1 and smaller than or equal to 12/(X+1); the demodulation reference signal subcarrier refers to a subcarrier carrying demodulation reference signals; the first demodulation reference signal pattern refers to a demodulation reference signal pattern used when the base station allocates the single PRB to the user equipment for channel estimation; and a transmitting unit, configured to transmit the configured M PRBs to the user equipment, so that the user equipment performs joint channel estimation according to the configured M PRBs.

An embodiment of the present invention provides a user equipment, including:

a receiving unit, configured to receive the M PRBs sent by a base station for joint channel estimation, where the M PRBs include (X−1)M+1 demodulation reference signal subcarriers, and based on a boundary of every two PRBs, only one demodulation reference signal subcarrier is within a range of (−N, N] subcarriers in the border of every two PRBs, and locations of the rest (X−2)M+2 demodulation reference signal subcarriers keep consistent with locations of demodulation reference signal subcarriers in M contiguous first demodulation reference signal patterns in a frequency domain;

where X indicates number of demodulation reference signal subcarriers included in the reference signal pattern of a single PRB when the base station allocates the single PRB to the user equipment for channel estimation; M is a positive integer greater than 1; N is a positive integer greater than 1 and smaller than or equal to 12/(X+1); the demodulation reference signal subcarrier refers to a subcarrier carrying demodulation reference signals; the first demodulation reference signal pattern refers to a demodulation reference signal pattern used when the base station allocates the single PRB to the user equipment for channel estimation; and a channel estimating unit, configured to obtain received signal values of the demodulation reference signal from the demodulation reference signal subcarrier from the M PRBs received by the receiving unit, estimate channel coefficients for the position of the demodulation reference signal according to the received signal values, and obtain channel coefficients for the position of data in the M PRBs according to the channel coefficients for the position of the demodulation reference signal and a relative position relationship between the demodulation reference signal and the data.

According to embodiments of the present invention, when multiple PRBs are scheduled for joint channel estimation, the reference signal configuration mode may be adjusted properly to improve the service data transmission efficiency without changing the channel estimation accuracy. This saves reference signal overhead and increases data transmission rate. Moreover, when different numbers of PRBs are used for joint channel estimation, the reference signal overhead and the reference signal pattern change adaptively to optimize the data transmission rate. Thereby, the problem that performance is restricted due to the unchanged reference signal structure when multiple PRBs are used for joint channel estimation is effectively solved.

DETAILED DESCRIPTION OF THE EMBODIMENTS

In order to make the objectives, technical solutions, and advantages of the present invention more comprehensible, the technical solutions according to embodiments of the present invention are clearly and completely described in the following with reference to the accompanying drawings. Apparently, the embodiments in the following description are merely a part rather than all of the embodiments of the present invention. Based on embodiments of the present invention, all other embodiments obtained by persons skilled in the art without making any creative effort shall fall within the protection scope of the present invention.

Figure 1:
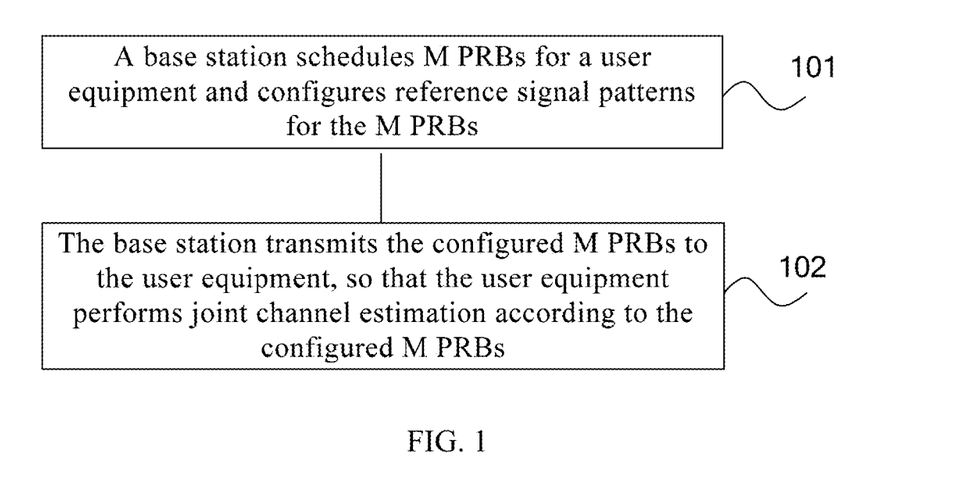
FIG. 1 is a flowchart of a method for transmitting physical resource blocks according to an embodiment of the present invention.

As shown in FIG. 1, an embodiment of the present invention provides a method for transmitting physical resource blocks, including:

Step 101: A base station schedules M physical resource blocks (PRBs) for a user equipment and configures reference signal patterns for the M PRBs. The method for configuring the reference signal patterns includes:

allocating (X−1)M+1 demodulation reference signal subcarriers for M PRBs in a frequency domain, and based on a boundary of every two PRBs, configuring only one demodulation reference signal subcarrier within the range of (−N, N] subcarriers in the border of every two PRBs, where locations of the rest (X−2)M+2 demodulation reference signal subcarriers keep consistent with the locations of demodulation reference signal subcarriers in the M contiguous first demodulation reference signal patterns in a frequency domain;

where X indicates the number of demodulation reference signal subcarriers included in the reference signal pattern of the single PRB when the base station allocates a single PRB to the user equipment for channel estimation; M is a positive integer greater than 1; N is a positive integer greater than 1 and smaller than or equal to 12/(X+1); the demodulation reference signal subcarrier refers to a subcarrier carrying demodulation reference signals; the first demodulation reference signal pattern refers to a demodulation reference signal pattern used when the base station allocates a single PRB to the user equipment for channel estimation.

Further, to improve the channel estimation performance, when performing the above configuration, the only one demodulation reference signal subcarrier within the range of (−N, N] subcarriers in the border of every two PRBs may be kept equidistant from the adjacent upper and lower demodulation reference signal subcarriers.

Step 102: The base station transmits the configured M PRBs to the user equipment, so that the user equipment performs joint channel estimation according to the configured M PRBs.

Figure 2:
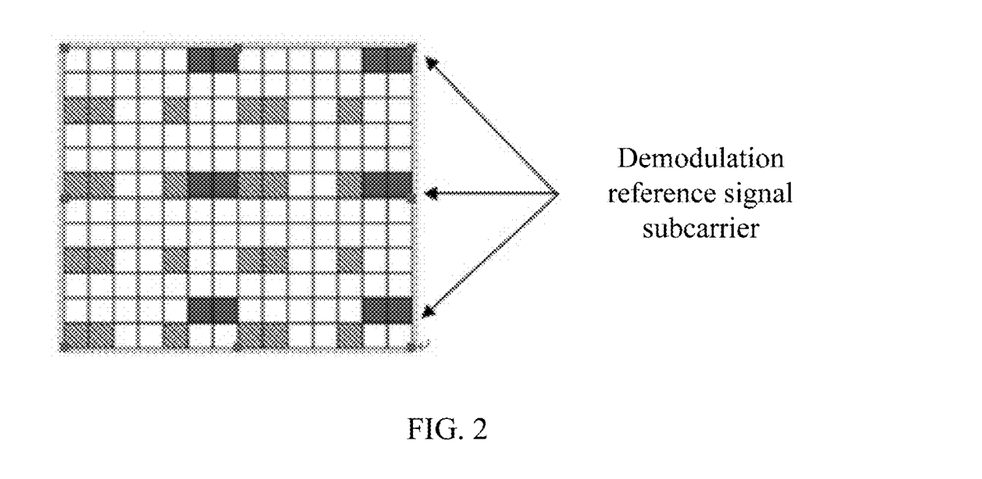
FIG. 2 is a schematic diagram of the reference signal pattern in a single PRB in the prior art.

The following describes the method provided in an embodiment of the present invention by using the demodulation reference signal pattern used when the base station allocates a single PRB to the user equipment for channel estimation as the first demodulation reference signal pattern as an example:

FIG. 2 shows the demodulation reference signal pattern used when a single PRB is used for channel estimation in existing LTE-A (Long Term Evolution-Advanced, long term evolution-advanced) systems. The demodulation reference signal pattern includes 14*12 REs (resource element, resource element). The area filled with oblique lines represents CRSs (Common reference signal, common reference signals), and the areas with gray shadow represent different DMRSs (Dedicated demodulation reference signal, dedicated demodulation reference signals, hereinafter referred to as demodulation reference signals for simplicity). The demodulation reference signal subcarrier refers to a subcarrier carrying demodulation reference signals in a frequency domain.

Figure 3:
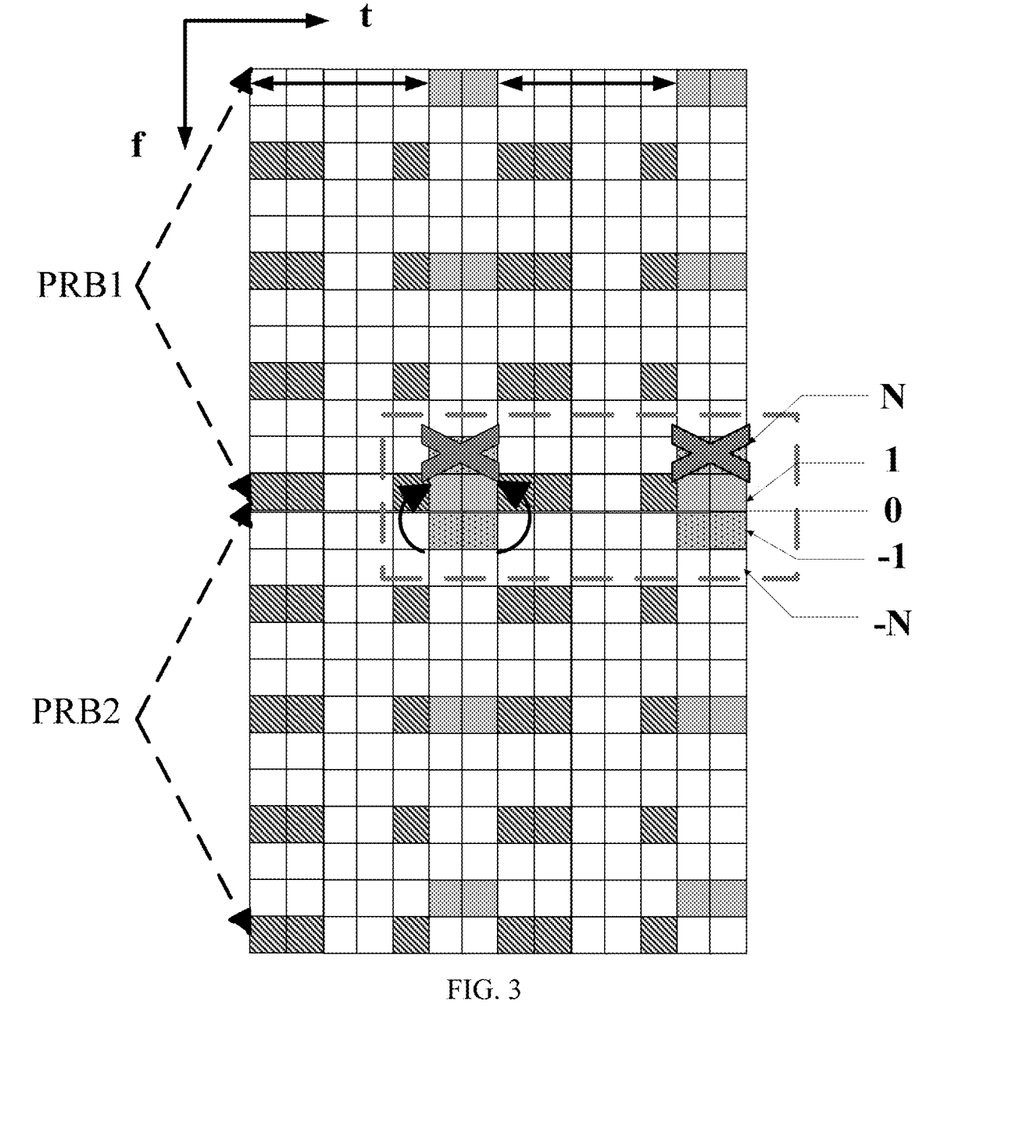
FIG. 3 is a schematic diagram of the reference signal pattern in a PRB bundling scenario according to an embodiment of the present invention.

FIG. 3 shows a reference signal pattern configured by using the method provided in an embodiment of the present invention when the values of M, N, and X in the above embodiment are set to 2, 2, and 3 respectively. The area filled with oblique lines represents CRSs (Common reference signal, common reference signals), and the areas with gray shadow represent different DMRSs (Dedicated demodulation reference signal, dedicated demodulation reference signals). Only one demodulation reference signal subcarrier exists within the range of (−N, N] subcarriers in the border of the PRBs. When this demodulation reference signal subcarrier is equidistant from the adjacent upper and lower demodulation reference signal subcarriers, better channel estimation performance can be achieved.

Figure 4:
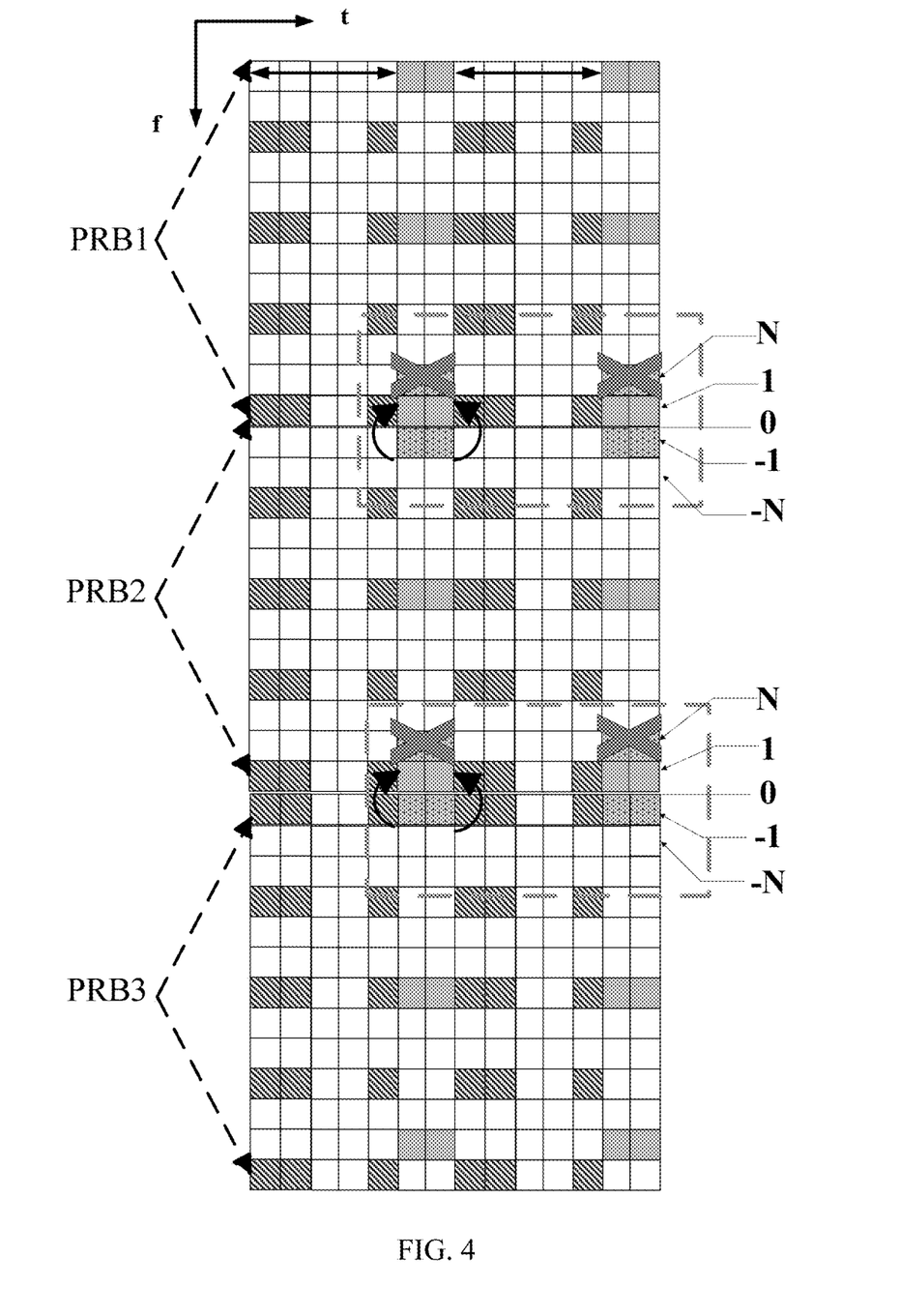
FIG. 4 is a schematic diagram of the reference signal pattern in another PRB bundling scenario according to an embodiment of the present invention.

FIG. 4 shows a reference signal pattern configured by using the method provided in an embodiment of the present invention when the values of M, N, and X are set to 3, 2, and 3 respectively. The area filled with oblique lines represents CRSs, and the areas with gray shadow represent different DMRSs. Only one demodulation reference signal subcarrier exists within the range of (−N, N] subcarriers in the border of the PRBs. When this demodulation reference signal subcarrier is equidistant from the adjacent upper and lower demodulation reference signal subcarriers, better channel estimation performance can be achieved.

Similarly, the reference signal configuration mode used when M is set to a greater value can be inferred according to the above method, and will not be described here any further.

Table 1 lists percentage of reference signal overhead reduction when different numbers of PRBs are allocated for joint channel estimation according to this embodiment.

TABLE 1

| Percentage of reference signal overhead reduction | | | | |
|---|---|---|---|---|
| | Number of PRBs | | | |
| | 2 PRB | 3 PRB | 4 PRB | 5 PRB |
| Percentage of reference signal overhead reduction | 17% | 22% | 25% | 27% |

According to the method provided in an embodiment of the present invention, when multiple PRBs are scheduled for joint channel estimation, the configuration modes of reference signal patterns may be properly adjusted to improve the service data transmission efficiency without changing the channel estimation precision. This saves reference signal overhead and optimizes data transmission rate. Moreover, when different numbers of PRBs are used for joint channel estimation, the reference signal overhead and the reference signal pattern change adaptively to optimize the data transmission rate. Thereby, the problem that performance is restricted due to the unchanged reference signal structure when multiple PRBs are used for joint channel estimation is effectively solved.

Figure 5:
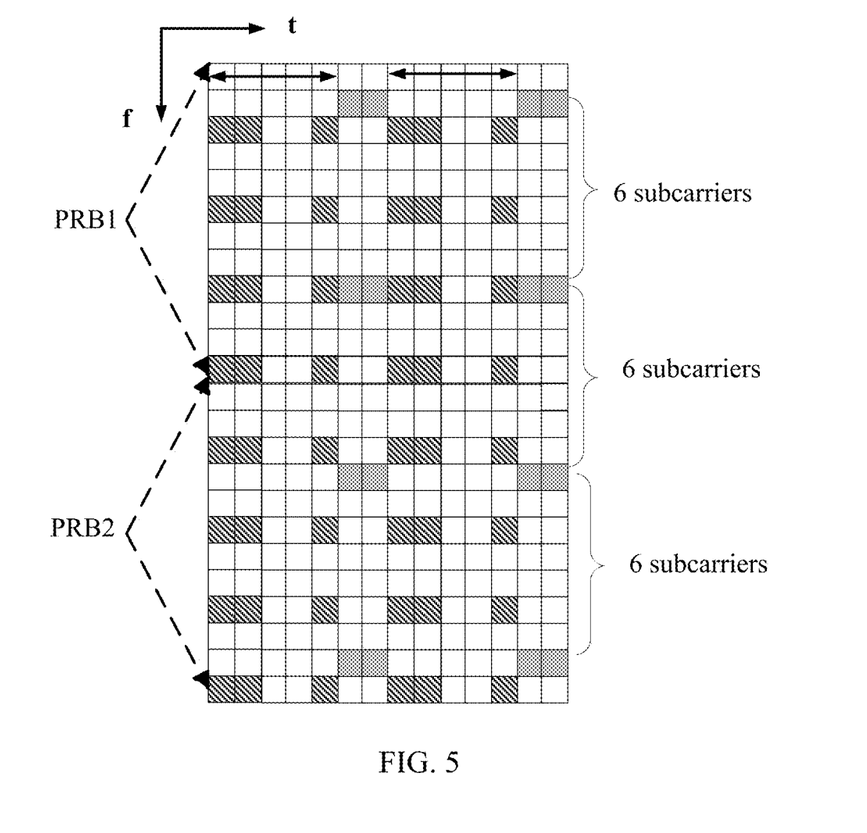
FIG. 5 is a schematic diagram of the reference signal pattern in another PRB bundling scenario according to an embodiment of the present invention.

An embodiment of the present invention provides another method for transmitting physical resource blocks, including:

evenly distributing a reference signal structure in the bundled M PRBs, and setting the start position of a reference signal frequency domain to S, the frequency domain interval to L, and the position of the demodulation reference signal subcarrier to m to obtain $m=n*L+S, n \in \{0,1,\ldots,M*3\}$. FIG. 5 shows a new reference signal structure when S is set to 2 and L is set to 6. For joint channel estimation based on two PRBs, the reference signal structure occupies only four subcarriers. Compared with the first demodulation reference signal pattern where six subcarriers are occupied, this reference signal structure greatly reduces the overhead and improves the throughput.

Figure 6:
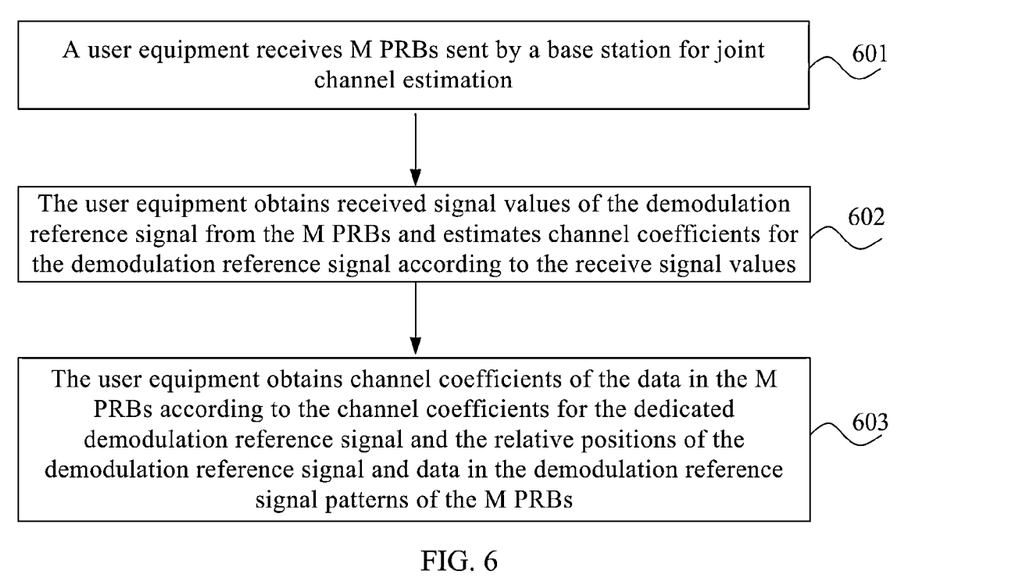
FIG. 6 is a flowchart of a method for a user equipment to perform channel estimation according to an embodiment of the present invention.

An embodiment of the present invention provides a method for a user equipment to perform channel estimation, which corresponds to the method for a base station to configure reference signals illustrated in FIG. 1. As shown in FIG. 6, the method includes:

Step 601: The user equipment receives the M PRBs sent by a base station for joint channel estimation.

The M PRBs include (X−1)M+1 demodulation reference signal subcarriers, and based on a boundary of every two PRBs, only one demodulation reference signal subcarrier is configured within the range of (−N, N] subcarriers in the border of every two PRBs, and the locations of the rest (X−2)M+2 demodulation reference signal subcarriers keep consistent with the locations of demodulation reference signal subcarriers in the M contiguous first demodulation reference signal patterns in a frequency domain.

Where X indicates the number of demodulation reference signal subcarriers included in the reference signal pattern of a single PRB when the base station allocates the single PRB to the user equipment for channel estimation; M is a positive integer greater than 1; N is a positive integer greater than 1 and smaller than or equal to 12/(X+1); the demodulation reference signal subcarrier refers to a subcarrier carrying demodulation reference signals; the first demodulation reference signal pattern refers to a demodulation reference signal pattern used when the base station allocates a single PRB to the user equipment for channel estimation.

Step 602: The user equipment obtains received signal values of the demodulation reference signal from the M PRBs and estimates channel coefficients for the position of the demodulation reference signal according to the received signal values of the demodulation reference signal.

The received signal values refer to signal values of the demodulation reference signal in the M PRBs received by the user equipment. The method for estimating channel coefficients for the position of the demodulation reference signal according to the received signal values of the demodulation reference signal can be performed according to the prior art. The method includes estimating channel coefficients for the position of the demodulation reference signal according to the signal values of the demodulation reference signal in the M PRBs sent by the base station and the received signal values of the demodulation reference signal obtained from the M PRBs by the user equipment.

For example, the above estimation algorithm may be LS (least square, least square).

Step 603: The user equipment obtains channel coefficients for the position of the data in the M PRBs according to the channel coefficients for the position of the demodulation reference signal and a relative position relationship between the demodulation reference signal and data in the demodulation reference signal patterns of the M PRBs.

Specifically, the channel coefficients for the above position of the reference signal are interpolated using a certain interpolation algorithm such as linear interpolation or MMSE (minimum mean square error, minimum mean square error) to obtain the channel coefficients for the position of the data in the M PRBs.

According to the method provided in this embodiment, the user equipment may use multiple PRBs for channel estimation and adapt to flexible configuration of the reference signal patterns of the base station. This configuration optimizes the data transmission rate and effectively solves the problem that performance is restricted due to the unchanged reference signal structure when multiple PRBs are used for joint channel estimation.

Persons skilled in the art may understand that all or part of the steps in the above embodiments may be completed by a computer program instructing relevant hardware. The program may be stored in a computer readable storage medium such as a ROM/RAM, a magnetic disk, or an optical disk.

Figure 7:
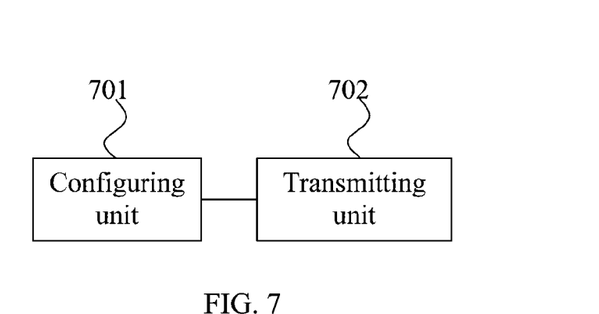
FIG. 7 is a schematic structural diagram of a base station according to an embodiment of the present invention.

FIG. 7 is a schematic structural diagram of a base station according to an embodiment of the present invention. The base station implements the method provided in the embodiment illustrated in FIG. 1. The base station includes a configuring unit 701 and a transmitting unit 702.

The configuring unit 701 is configured to schedule M PRBs for a user equipment and configure reference signal patterns for the M PRBs according to a first manner The first manner includes:

allocating (X−1)M+1 demodulation reference signal subcarriers for M PRBs in a frequency domain, and based on a boundary of every two PRBs, configuring only one demodulation reference signal subcarrier within the range of (−N, N] subcarriers in the border of every two PRBs, where the locations of the rest (X−2)M+2 demodulation reference signal subcarriers keep consistent with the locations of demodulation reference signal subcarriers in the M contiguous first demodulation reference signal patterns in a frequency domain;

where X indicates the number of demodulation reference signal subcarriers included in the reference signal pattern of the single PRB when the base station allocates a single PRB to the user equipment for channel estimation; M is a positive integer greater than 1; N is a positive integer greater than 1 and smaller than or equal to 12/(X+1); the demodulation reference signal subcarrier refers to a subcarrier carrying demodulation reference signals; the first demodulation reference signal pattern refers to a demodulation reference signal pattern used when the base station allocates a single PRB to the user equipment for channel estimation.

The transmitting unit 702 is configured to transmit the M PRBs configured by the configuring unit 701 to the user equipment, so that the user equipment performs joint channel estimation according to the configured M PRBs.

For the interactions between the base station units and the user equipment and the specific implementation methods of the unit functions, reference may be made to the descriptions in the method embodiments.

According to this embodiment, when multiple PRBs are used for joint channel estimation, the base station may reduce the reference signal overhead and adjust the reference signal pattern to improve the service data transmission efficiency without changing the channel estimation precision. Moreover, when different numbers of PRBs are used for joint channel estimation, the reference signal overhead and the reference signal pattern will change adaptively to optimize the data transmission rate.

Figure 8:
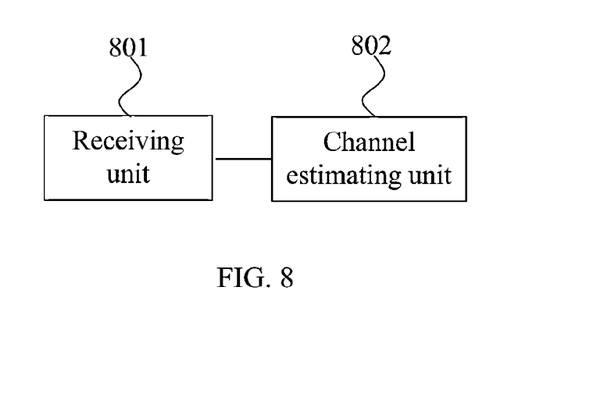
FIG. 8 is a schematic structural diagram of a user equipment according to an embodiment of the present invention.

FIG. 8 is a schematic structural diagram of a user equipment according to an embodiment of the present invention. The user equipment implements the method provided in the embodiment illustrated in FIG. 6. The user equipment includes a receiving unit 801 and a channel estimating unit 802.

The receiving unit 801 is configured to receive the M PRBs sent by a base station for joint channel estimation, where the M PRBs include (X−1)M+1 demodulation reference signal subcarriers, and based on a boundary of every two PRBs, only one demodulation reference signal subcarrier is within the range of (−N, N] subcarriers in the border of every two PRBs, and the locations of the rest (X−2)M+2 demodulation reference signal subcarriers keep consistent with the locations of demodulation reference signal subcarriers in the M contiguous first demodulation reference signal patterns in a frequency domain;

where X indicates the number of demodulation reference signal subcarriers included in the reference signal pattern of a single PRB when the base station allocates the single PRB to the user equipment for channel estimation; M is a positive integer greater than 1; N is a positive integer greater than 1 and smaller than or equal to 12/(X+1); the demodulation reference signal subcarrier refers to a subcarrier carrying demodulation reference signals; the first demodulation reference signal pattern refers to a demodulation reference signal pattern used when the base station allocates a single PRB to the user equipment for channel estimation.

For example, M, the number of PRBs used for joint channel estimation received by the receiving unit 801 from the base station, may be equal to 2 or 3, N is equal to 2, and X is equal to 3.

The channel estimating unit 802 is configured to obtain received signal values of the demodulation reference signal from the demodulation reference signal subcarrier from the M PRBs received by the receiving unit 801, estimate channel coefficients for the position of the demodulation reference signal according to the received signal values of demodulation reference signal, and obtain the channel coefficients for the position of the data in the M PRBs according to the channel coefficients for the position of the demodulation reference signal and a relative position relationship between the demodulation reference signal and data in the demodulation reference signal patterns of the M PRBs.

For the specific estimation method of the channel estimating unit 802, reference may be made to the method described in step 602 and step 603 of the embodiment illustrated in FIG. 6.

For the interactions between the user equipment units and the base station and the specific implementation methods of the unit functions, reference may be made to the descriptions in the method embodiments of the present invention.

According to this embodiment, the user equipment may use multiple PRBs for joint channel estimation and adapt to flexible configuration of the reference signal patterns of the base station. This configuration optimizes the data transmission rate and effectively solves the problem that performance is restricted due to an unchanged reference signal structure when multiple PRBs are used for joint channel estimation.

It should be specially noted that all or part of the above units can be integrated in a chip. In addition, function units in embodiments of the present invention may be integrated into a processing module, or each of the units may exist alone physically, or two or more units may be integrated into a module. The integrated module may be implemented in a form of hardware, or may be implemented in form of a software functional module. When the integrated module is implemented in form of a software function module and sold or used as an independent product, the module may be stored in a computer readable storage medium. The storage medium may be a read-only memory, a magnetic disk, or an optical disk.

Drawings and relevant descriptions are merely provided for describing the principles of the present invention, but not intended to limit the protection scope of the present invention. For example, the names and entities of messages in embodiments of the present invention may vary with the networks, and some messages may be omitted. Any modification, equivalent replacement, and improvement made within the spirit and principle of the present invention all fall within the protection scope of the present invention.

Although the present invention is described in detail with reference to some preferred embodiments, persons skilled in the art should understand that, modifications and variations can be made to the forms and details of the present invention without departing from the spirit and principle of the present invention.

What is claimed is:

1. A method for transmitting physical resource blocks, comprising:
scheduling, by a base station, M contiguous physical resource blocks (PRBs) for a user equipment and configuring reference signal patterns for the M PRBs, wherein the configuring the reference signal patterns comprises:
allocating (X−1)M+1 demodulation reference signal subcarriers for the M PRBs in a frequency domain, and based on a boundary of every two PRBs, configuring only one demodulation reference signal subcarrier within a range of (−N, N] subcarriers in the boundary of every two PRBs, where locations of remaining (X−2)M+2 demodulation reference signal subcarriers in each of the M contiguous PRBs are the same as locations of first demodulation reference signal patterns in the frequency domain;
where X indicates a quantity of demodulation reference signal subcarriers included in a reference signal pattern of a single PRB when the base station allocates the single PRB to the user equipment for channel estimation; M is a positive integer greater than 1; N is a positive integer greater than 1 and smaller than or equal to 12/(X+1); the demodulation reference signal subcarrier refers to a subcarrier carrying the demodulation reference signals; the first demodulation reference signal pattern refers to a demodulation reference signal pattern used when the base station allocates the single PRB to the user equipment for the channel estimation; and
transmitting the configured M PRBs to the user equipment, to enable the user equipment to perform a joint channel estimation according to the configured M PRBs.

2. The method according to claim 1, wherein:
M is equal to 2 or 3; N is equal to 2; and X is equal to 3.

3. The method according to claim 1, wherein the only one demodulation reference signal subcarrier configured within the range of (−N, N] subcarriers in the boundary of the every two PRBs is equidistant from two adjacent demodulation reference signal subcarriers.

4. The method according to claim 2, wherein the only one demodulation reference signal subcarrier configured within the range of (−N, N] subcarriers in the boundary of the every two PRBs is equidistant from two adjacent demodulation reference signal subcarriers.

5. A method for estimating channels, comprising:
receiving, by a user equipment, M contiguous physical resource blocks (PRBs) sent by a base station for joint channel estimation, where the M PRBs include (X−1) M+1 demodulation reference signal subcarriers, and based on a boundary of every two PRBs, only one demodulation reference signal subcarrier is within a range of (−N, N] subcarriers in the boundary of every two PRBs, and locations of remaining (X−2)M+2 demodulation reference signal subcarriers in each of the M contiguous PRBs are the same as locations of first demodulation reference signal patterns in a frequency domain;
where X indicates a quantity of demodulation reference signal subcarriers included in a reference signal pattern of a single PRB when the base station allocates the single PRB to the user equipment for the channel estimation; M is a positive integer greater than 1; N is a positive integer greater than 1 and smaller than or equal to 12/(X+1); the demodulation reference signal subcarrier refers to a subcarrier carrying demodulation reference signals; the first demodulation reference signal pattern refers to a demodulation reference signal pattern used when the base station allocates the single PRB to the user equipment for the channel estimation;
obtaining, by the user equipment, received signal values of the demodulation reference signal from the demodulation reference signal subcarrier for the M PRBs, and according to the received signal values, estimating channel coefficients for position of the demodulation reference signal; and
obtaining channel coefficients for position of data in the M PRBs according to the channel coefficients for the position of the demodulation reference signal and a relative position relationship between the demodulation reference signal and the data.

6. The method according to claim 5, wherein:
M is equal to 2 or 3; N is equal to 2; and X is equal to 3.

7. The method according to claim 5, wherein the only one demodulation reference signal subcarrier configured within the range of (−N, N] subcarriers in the boundary of every two PRBs is equidistant from two adjacent demodulation reference signal subcarriers.

8. The method according to claim 6, wherein the only one demodulation reference signal subcarrier configured within the range of (−N, N] subcarriers in the boundary of every two PRBs is equidistant from two adjacent demodulation reference signal subcarriers.

9. A base station, comprising a processor and a non-transitory processor-readable medium having processor-executable instructions stores thereon, wherein, when executed, the processor is configured to:
schedule M contiguous physical resource blocks (PRBs) for a user equipment and configure reference signal patterns for the M PRBs according to a process, comprising:
allocating (X−1)M+1 demodulation reference signal subcarriers for the M PRBs in a frequency domain, and based on a boundary of every two PRBs, configuring only one demodulation reference signal subcarrier within a range of (−N, N] subcarriers in the boundary of every two PRBs, wherein locations of remaining (X−2)M+2 demodulation reference signal subcarriers in each of the M contiguous PRBs are the same as locations of first demodulation reference signal patterns in the frequency domain;
where X indicates the number of demodulation reference signal subcarriers included in a reference signal pattern of a single PRB when the base station allocates the single PRB to the user equipment for a channel estimation; M is a positive integer greater than 1; N is a positive integer greater than 1 and smaller than or equal to 12/(X+1); the demodulation reference signal subcarrier refers to a subcarrier carrying demodulation reference signals; the first demodulation reference signal pattern refers to a demodulation reference signal pattern used when the base station allocates the single PRB to the user equipment for the channel estimation; and
transmit the configured M PRBs to the user equipment, to enable the user equipment to perform a joint channel estimation according to the configured M PRBs.

10. The base station according to claim 9, wherein N is set to 2 and X is set to 3 according to the process; and the processor is configured to schedule two or three PRBs for the user equipment and configure reference signal patterns for the two or three PRBs according to the process.

11. A user equipment, comprising a processor and a non-transitory processor-readable medium having processor-executable instructions stored thereon, wherein, when executed the processor is configured to:
receive M PRBs sent by a base station for joint channel estimation, wherein the M contiguous PRBs comprise (X−1)M+1 demodulation reference signal subcarriers, and based on a boundary of every two PRBs, only one demodulation reference signal subcarrier is within range of (−N, N] subcarriers in the boundary of every two PRBs, and locations of remaining (X−2)M+2 demodulation reference signal subcarriers in each of the M contiguous PRBs are the same as locations of first demodulation reference signal patterns in a frequency domain;
where X indicates number of demodulation reference signal subcarriers included in a reference signal pattern of a single PRB when the base station allocates the single PRB to the user equipment for a channel estimation; M is a positive integer greater than 1; N is a positive integer greater than 1 and smaller than or equal to 12/(X+1); the demodulation reference signal subcarrier refers to a subcarrier carrying demodulation reference signals; the first demodulation reference signal pattern refers to a demodulation reference signal pattern used when the base station allocates the single PRB to the user equipment for the channel estimation; and
obtain received signal values of the demodulation reference signal from the demodulation reference signal subcarrier from the M PRBs received by the receiving unit, estimate channel coefficients for the position of the demodulation reference signal according to the received signal values of the demodulation reference signal, and obtain channel coefficients for the position of data in the M PRBs according to the channel coefficients for the position of the demodulation reference signal and a relative position relationship between the demodulation reference signal and the data.

12. The user equipment according to claim 11, wherein the number M of the PRBs used for a joint channel estimation received by the processor from the base station is equal to 2 or 3; N is equal to 2; and X is equal to 3.

* * * * *

UNITED STATES PATENT AND TRADEMARK OFFICE
CERTIFICATE OF CORRECTION

Page 1 of 1

PATENT NO. : 9,001,765 B2
APPLICATION NO. : 13/742899
DATED : April 7, 2015
INVENTOR(S) : Zhou et al.

It is certified that error appears in the above-identified patent and that said Letters Patent is hereby corrected as shown below:

In the claims

Column 11, line 53, "stores thereon" should read -- stored thereon --.

Signed and Sealed this
Twenty-fourth Day of November, 2015

Michelle K. Lee
*Director of the United States Patent and Trademark Office*